(12) United States Patent
Frost et al.

(10) Patent No.: US 12,539,820 B2
(45) Date of Patent: Feb. 3, 2026

(54) BUMPER ARRANGEMENT HAVING A CROSSMEMBER AND CRASH BOXES

(71) Applicant: BENTELER AUTOMOBILTECHNIK GMBH, Paderborn (DE)

(72) Inventors: Georg Frost, Steinheim (DE); Mathias Lohberg, Altenbeken (DE); Martin Schroeter, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 385 days.

(21) Appl. No.: 18/200,605

(22) Filed: May 23, 2023

(65) Prior Publication Data
US 2023/0382332 A1 Nov. 30, 2023

(30) Foreign Application Priority Data
May 24, 2022 (DE) .................. 10 2022 113 137.8

(51) Int. Cl.
*B60R 19/18* (2006.01)
*B60R 19/34* (2006.01)

(52) U.S. Cl.
CPC .............. *B60R 19/18* (2013.01); *B60R 19/34* (2013.01)

(58) Field of Classification Search
USPC ........................................................ 293/102
See application file for complete search history.

(56) References Cited

U.S. PATENT DOCUMENTS

| | | | | |
|---|---|---|---|---|
| 6,361,092 B1 * | 3/2002 | Eagle | ................ | B60R 19/18 |
| | | | | 293/121 |
| 6,398,275 B1 * | 6/2002 | Hartel | ................ | B60R 19/18 |
| | | | | 293/121 |
| 8,678,423 B1 * | 3/2014 | Hwang | ................ | B60R 19/34 |
| | | | | 280/505 |

FOREIGN PATENT DOCUMENTS

| | | | |
|---|---|---|---|
| DE | 4228878 A1 * | 3/1993 | ............ B60R 19/18 |
| DE | 102018119735 A1 | 2/2020 | |
| DE | 102020114662 A1 | 12/2021 | |
| WO | 2015145835 A1 | 10/2015 | |

OTHER PUBLICATIONS

Office Action for German Application No. 10 2022 113 137.8 mailed Jan. 16, 2023; 20pp.

* cited by examiner

*Primary Examiner* — Joseph D. Pape
(74) *Attorney, Agent, or Firm* — HAUPTMAN HAM, LLP

(57) ABSTRACT

A bumper arrangement, having a crossmember which is coupled via crash boxes to a motor vehicle, the crossmember having end regions, which project laterally beyond the crash boxes in the motor vehicle transverse direction, and attaching regions, in which the crash boxes are coupled to the crossmember, the crossmember being configured in cross section as a closed hollow profile, wherein a first slot which extends in the motor vehicle transverse direction is configured at least in longitudinal portions in the attaching region of a crash box in an upper wall, lower wall or a central bar of the crossmember, an outer end of the upper wall, lower wall and/or central bar being configured in one piece and from the same material continuously in the motor vehicle longitudinal direction.

20 Claims, 10 Drawing Sheets

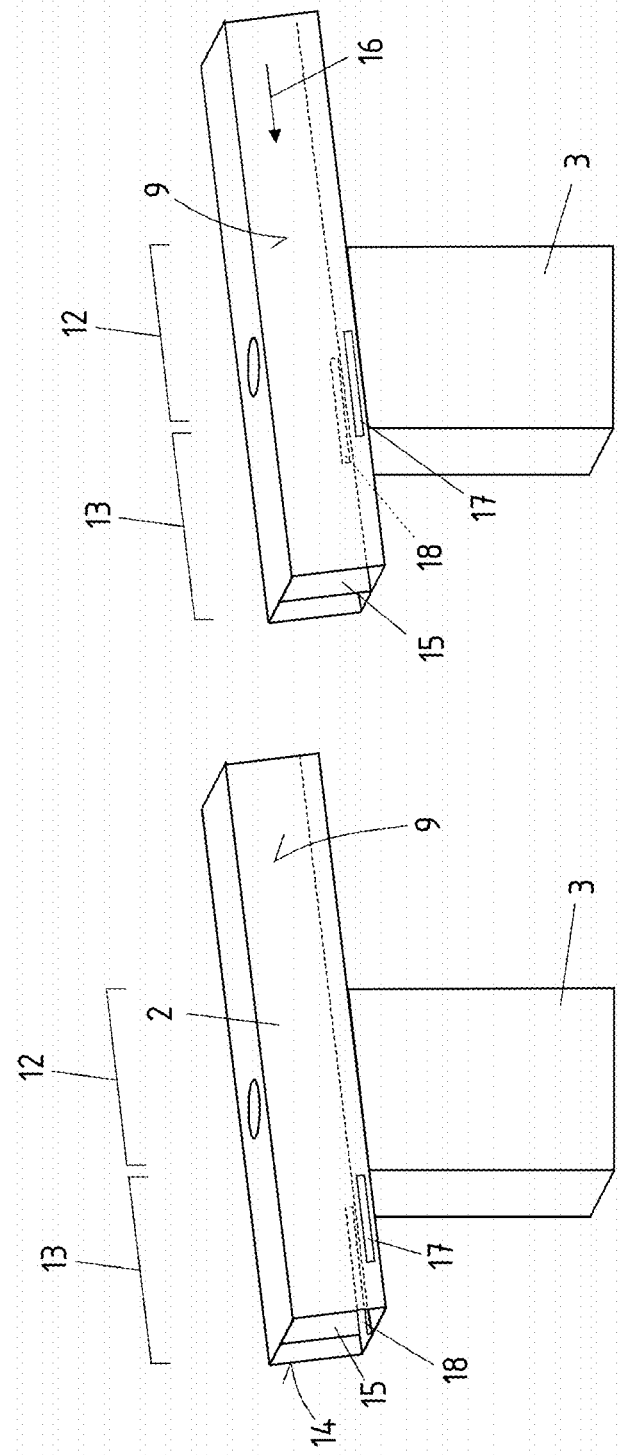

BUMPER ARRANGEMENT HAVING A CROSSMEMBER AND CRASH BOXES

RELATED APPLICATIONS

The present application claims priority to German Application Number 10 2022 113 137.8 filed May 24, 2022, the disclosure of which is hereby incorporated by reference herein in its entirety.

FIELD

The present disclosure relates to a bumper arrangement.

BACKGROUND

Bumper arrangements are arranged on the front side or on the end side of a motor vehicle. These bumper arrangements serve to convert crash energy into reshaping work in the case of an impact of the motor vehicle against an object.

Bumper arrangements of this type have a crossmember which extends substantially in the motor vehicle transverse direction and usually has a width which corresponds substantially to the motor vehicle itself or is slightly smaller. A crossmember of this type is connected via crash boxes to the motor vehicle. The crash boxes are usually arranged on the front side of longitudinal beams, in the case of a front bumper arrangement. The crossmember and the crash boxes are components which are produced separately from one another and are joined to one another, for example, by screw connections or welded connections.

There is a problem in the case of an impact, for example, a central impact, since rupturing is able to occur in the joint connection between the crossmember and the crash boxes, for example as a result of a pole or pillar, for example, if the crossmember itself is deformed repeatedly.

A similar addressed problem and an alternative proposed solution are described, for example, in WO 2015 145 835 A1.

SUMMARY

An object of the present disclosure is to provide a bumper arrangement which increases the crash performance in the case of a bumper arrangement mentioned at the outset and, in the case of a crash, prevents rupturing of the crossmember from the crash boxes.

According to the present disclosure, the above mentioned object is achieved by way of the features in the case of a bumper arrangement.

The bumper arrangement has a crossmember, the crossmember being coupled via crash boxes to a motor vehicle. This coupling takes place on the front side. The crossmember itself extends over a large part of the width of the motor vehicle. The crossmember is able to run in a rectilinear manner. The crossmember is able to have, however, a bent or curved profile. A longitudinal direction of the crossmember itself is oriented in the motor vehicle transverse direction. The crossmember itself is then coupled via crash boxes to the motor vehicle, for example, to the longitudinal beams of the motor vehicle. Furthermore, the crossmember projects laterally with end regions beyond the crash boxes. The end regions are therefore a length portion in the motor vehicle transverse direction or in the longitudinal direction of the crossmember itself. Furthermore, the crossmember has a length portion in its longitudinal direction which serves as an attaching region for the crash boxes. This region is called an attaching region.

Furthermore, the crossmember is coupled to the crash boxes. This coupling is configured, for example, as a welded connection. The welded connection is made only in portions. The welded connection is configured, however, so as to run around on the front side of the crash box, that is to say an upper side, a lower side and the respective two sides of the crash box are coupled to a rear side or rear wall of the crossmember.

The crossmember itself is configured as a closed hollow profile. In at least one embodiment, the crossmember is configured in cross section as a two-chamber hollow profile. To this end, the crossmember has an upper wall, a lower wall and a central bar which runs in a horizontally oriented manner substantially in the motor vehicle longitudinal direction. Furthermore, the crossmember has a front wall and a rear wall. The crossmember itself is able to be configured as an extruded component. The crossmember is also able to be configured, however, as an assembled part, for example made from steel material. Here, the crossmember is then configured as a C-shaped profile or top-hat profile which is open on one side in cross section, and is coupled to a closing plate. In the case of an extruded profile, the crossmember is produced from a light metal alloy, for example, aluminum alloy. As an alternative, the crossmember is also able to be produced as a roll formed profile.

According to the present disclosure, the crossmember is distinguished by the fact that the crossmember has a slot which extends in the motor vehicle transverse direction at least in longitudinal portions in the attaching region of a crash box in an upper wall, in a lower wall or in the central bar of the crossmember. The slot is therefore configured so as to run in a manner which is oriented in the longitudinal direction of the crossmember. The slot is also able to be called a recess or a slot-like recess. The slot is also able to be made without the removal of material, for example by way of disconnecting displacement within one of the walls (upper wall, lower wall, central bar) or between one of these walls and the rear wall of the crossmember.

According to at least one embodiment, an outer end of the upper wall, the lower wall and/or the central bar is in one piece and from the same material continuously in the motor vehicle longitudinal direction. Therefore, the slot is not of continuous configuration as far as an end side of the crossmember. The slot runs at least in length portions in the attaching region. The slot is also able to merge in length portions into the end region which projects laterally beyond the crash box. According to the present disclosure, however, the slot stops in front of the outer end of the crossmember. There is therefore no slot at the outer end. The slot is spaced apart from the exposed end at a spacing of at least 10 mm.

In at least one embodiment, the slot is able to be configured as a cutout so as to reach completely through the upper wall, the lower wall and/or the central bar. As a consequence, a complete physical separation takes place here. However, the slot is also able to be a longitudinal perforation. The slot does not have a completely continuous configuration. The slot is also able to be configured by way of punctiform recesses or bores which follow one another or else by way of elongate holes which follow one another. In at least one embodiment, the slot is not a complete physical severing of the upper wall, lower wall and/or central bar, but rather a notch or targeted weakened portion.

The crash performance is increased by way of the slot according to the present disclosure, since the welded seams which are present in the attaching region of the crossmember to the crash box are not subjected to a direct crash. The crash energy is therefore first of all dissipated by way of the slot and/or the crossmember is able to deform slightly more freely in the region of the slot, with the result that the deformation of the crossmember is not forwarded directly to the welded connection, lying behind the crossmember, to the crash box.

In at least one embodiment, the slot is precisely not of continuous configuration as far as the outer end of the crossmember. This is able to be seen in the connection to a towing eye. The design variant according to the present disclosure also withstands a towing test. Horizontally downwardly directed tensioning, for example, for fastening on a vehicle transporter, or a load of the towing eye therefore does not lead to a deformation of the crossmember itself. This is achieved by way of the continuous front side or end side.

In at least one embodiment according to the present disclosure, the slot extends over an outer length portion in the motor vehicle transverse direction of the attaching portion. The slot is not arranged in that region of the attaching portion which points toward the center of the crossmember, but rather is arranged in length portions in a length portion which is oriented toward the outer end region of the crossmember.

The slot extends over at least 25%, more than 30%, or more than 50%, in the longitudinal direction of the attaching region.

The slot extends over a length region of at least 20%, more than 30%, or more than 40% of the end region. The slot extends, however, over less than 80%, or less than 70% of the length portion of the end region. At least 10 mm of length portion of the end region remain, in which no slot is configured at each end.

In at least one embodiment, two slots are provided in the region of each crash box, at least one slot according to the present disclosure being configured in the upper wall, in the lower wall or the central bar, and a second slot then being arranged in the remaining upper wall, the remaining lower wall or the remaining central bar, in which the first slot is not arranged.

To this end, the second slot is able to be of longer configuration in its longitudinal direction than the first slot, and the second slot is able to be configured in the central bar, the first slot then being, a slot which is then configured in the upper wall and/or the lower wall.

The second slot is able to be of at least 10%, more than 25%, or more than 35% longer configuration in relation to the first slot. The second slot is, however, configured to be at most twice as long in relation to the first slot.

In at least one embodiment, the second slot is able to be of continuous configuration in its longitudinal extent from one end side of the crossmember. In contrast to the first slot, no outer end then remains continuous, but rather the outer end is completely severed.

In at least one embodiment, the slot is arranged in the motor vehicle longitudinal direction in the region of the rear wall of the crossmember in the upper wall, the lower wall and/or the central bar. In at least one embodiment, the slot is configured so as to directly join the rear wall.

The crossmember and/or the crash box are/is produced from light metal alloys, from aluminum alloys, and by way of extrusion. The crossmember and the crash box is able to be reworked using machining.

BRIEF DESCRIPTION OF THE DRAWINGS

Further advantages, features, properties and aspects of the present disclosure are the subject matter of the following description. In the figures:

FIG. 9 shows a perspective view of the bumper arrangement according to at least one embodiment, FIG. 10 shows a perspective view of the bumper arrangement according to at least one embodiment.

DETAILED DESCRIPTION

In the figures, the same reference signs are used for identical or similar components, even if a repeated description is dispensed with for reasons of simplicity.

Figure 1A:
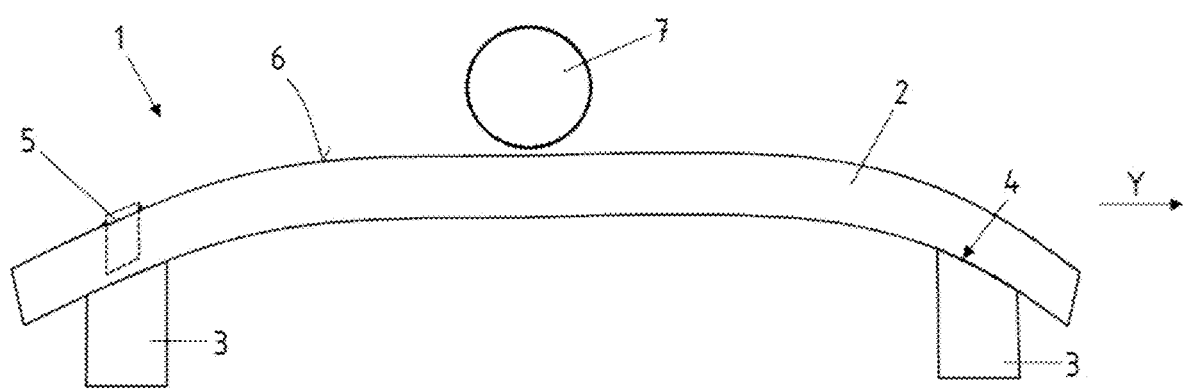
FIG. 1A and FIG. 1B show a plan view of a bumper arrangement, according to at least one embodiment.
Figure 1B:
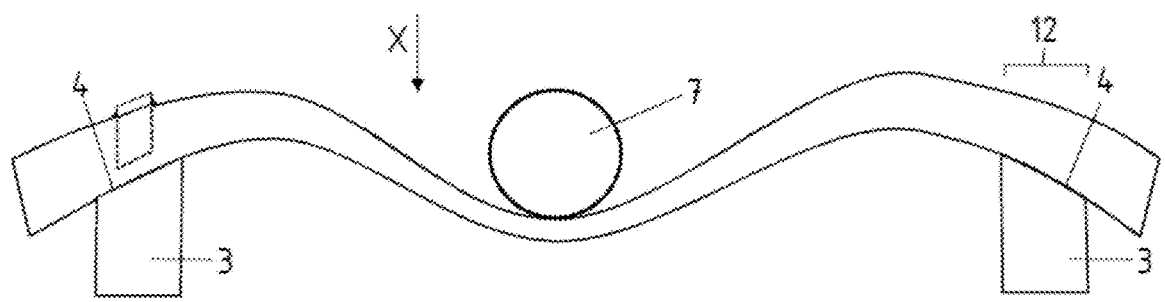

FIG. 1A and FIG. 1B show a bumper arrangement 1. The bumper arrangement 1 has a crossmember 2 which extends substantially in the motor vehicle transverse direction y, and the crossmember 2 is fixed in each case on the end side via two crash boxes 3 to a motor vehicle (not shown in greater detail). The crash boxes 3 in any case have a coupling region 4, in which the crash boxes 3 are coupled to the crossmember 2 by way of a weld. Furthermore, a towing eye 5 is shown. The towing eye 5 is coupled to a front wall 6 of the crossmember 2. If the motor vehicle then impacts with a pole 7 which is shown, for example in a center pole test, the crossmember 2 is deformed in the motor vehicle longitudinal direction x. In the respective attaching region 12, a corresponding load therefore occurs, with the result that, in the extreme case such as the center pole test, the coupling between the crossmember 2 and the crash box 3 detaches.

Figure 2A:
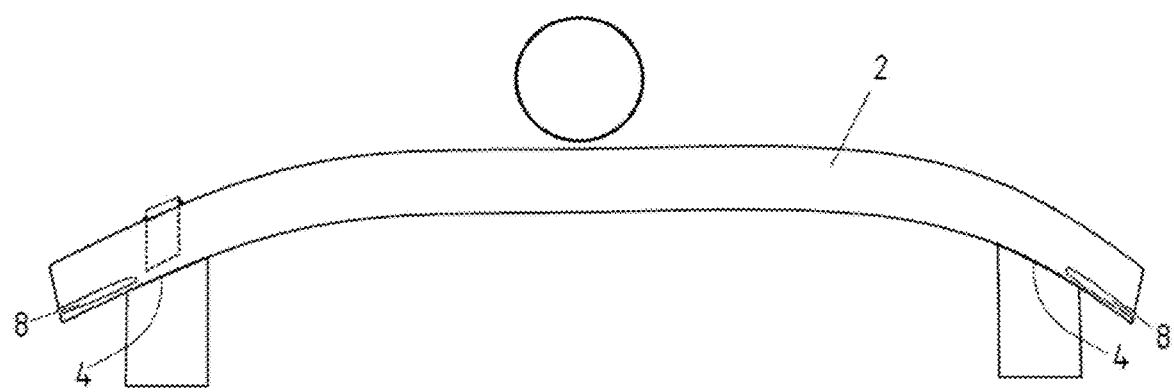
FIG. 2A and FIG. 2B show the arrangement of FIG. 1A and FIG. 1B, in each case with end slots, according to at least one embodiment.
Figure 2B:
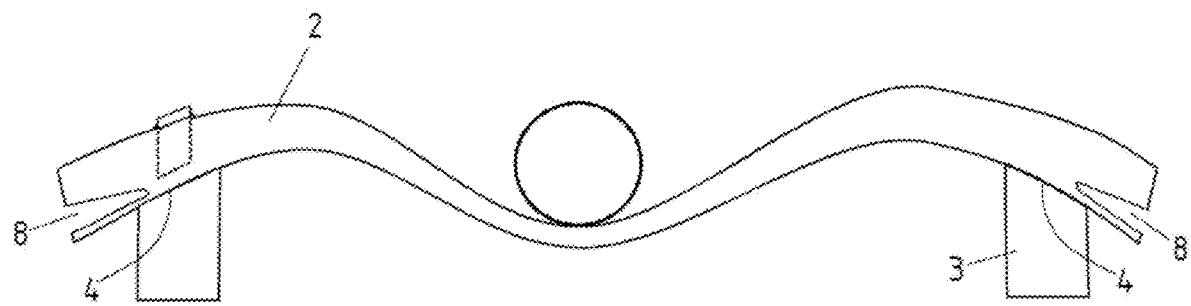

FIG. 2A and FIG. 2B show the arrangement from FIG. 1A and FIG. 1B, in each case as end slots 8 being arranged here. The end slots 8 are deformed plastically here, with the result that relieving occurs in the coupling region 4 from the crash box 3 to the crossmember 2.

Figure 3A:
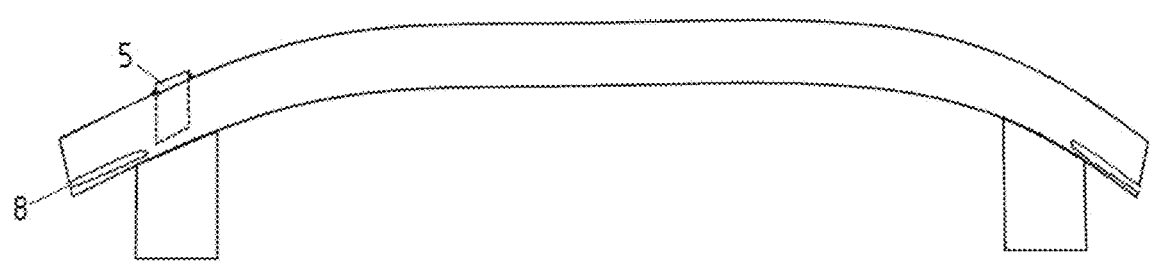
FIG. 3A and FIG. 3B show the arrangement of FIG. 2A and FIG. 2B, under the action of force, according to at least one embodiment.
Figure 3B:
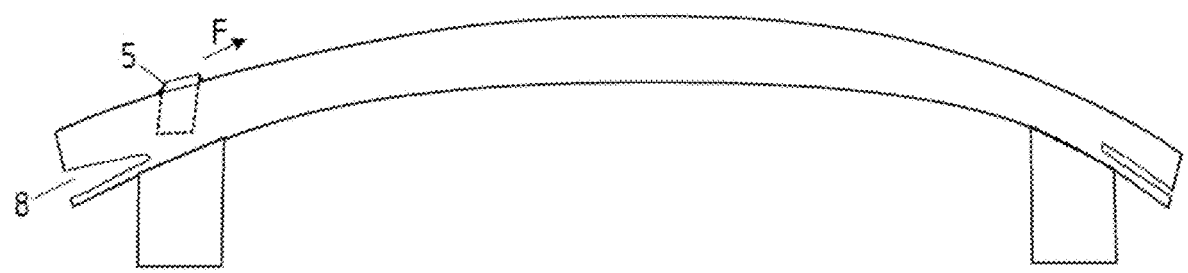

In FIG. 3A and FIG. 3B the case of an introduction of force F to the towing eye 5, the left-hand (in relation to the plane of the image) end slot 8 is widened or lengthens further inward as a result of rupturing. A bumper of this type, shown in FIG. 2A and FIG. 2B, does not pass a towing test, since the crossmember must not be deformed plastically or broken in a test of this type.

Figure 4A:
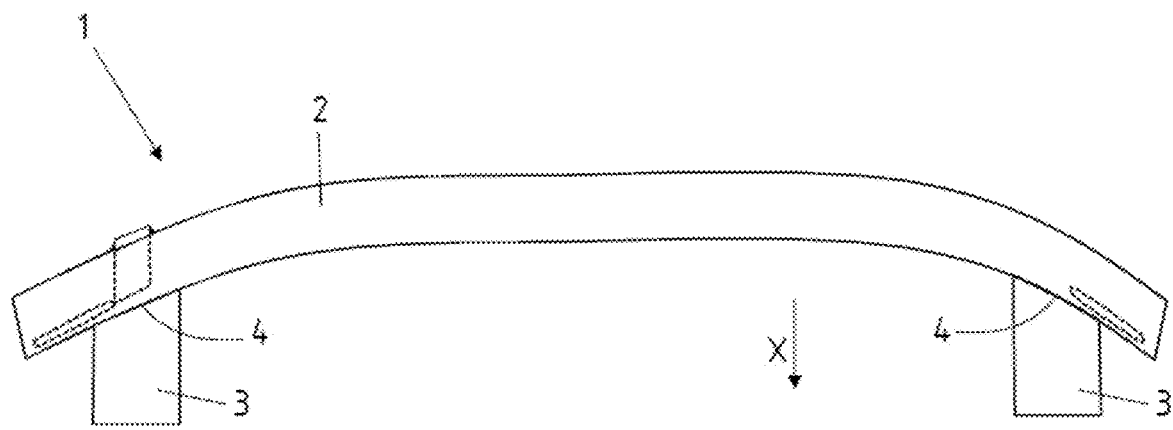
FIG. 4A, FIG. 4B, and FIG. 4C show a bumper arrangement according to at least one embodiment.
Figure 4B:
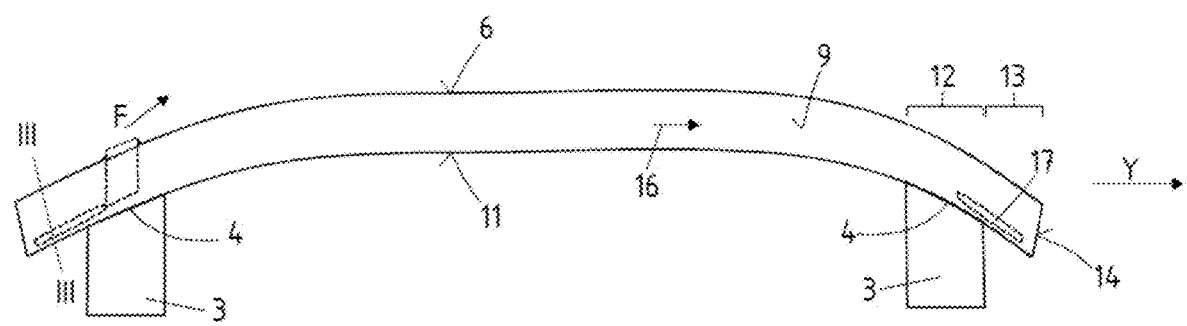
Figure 4C:
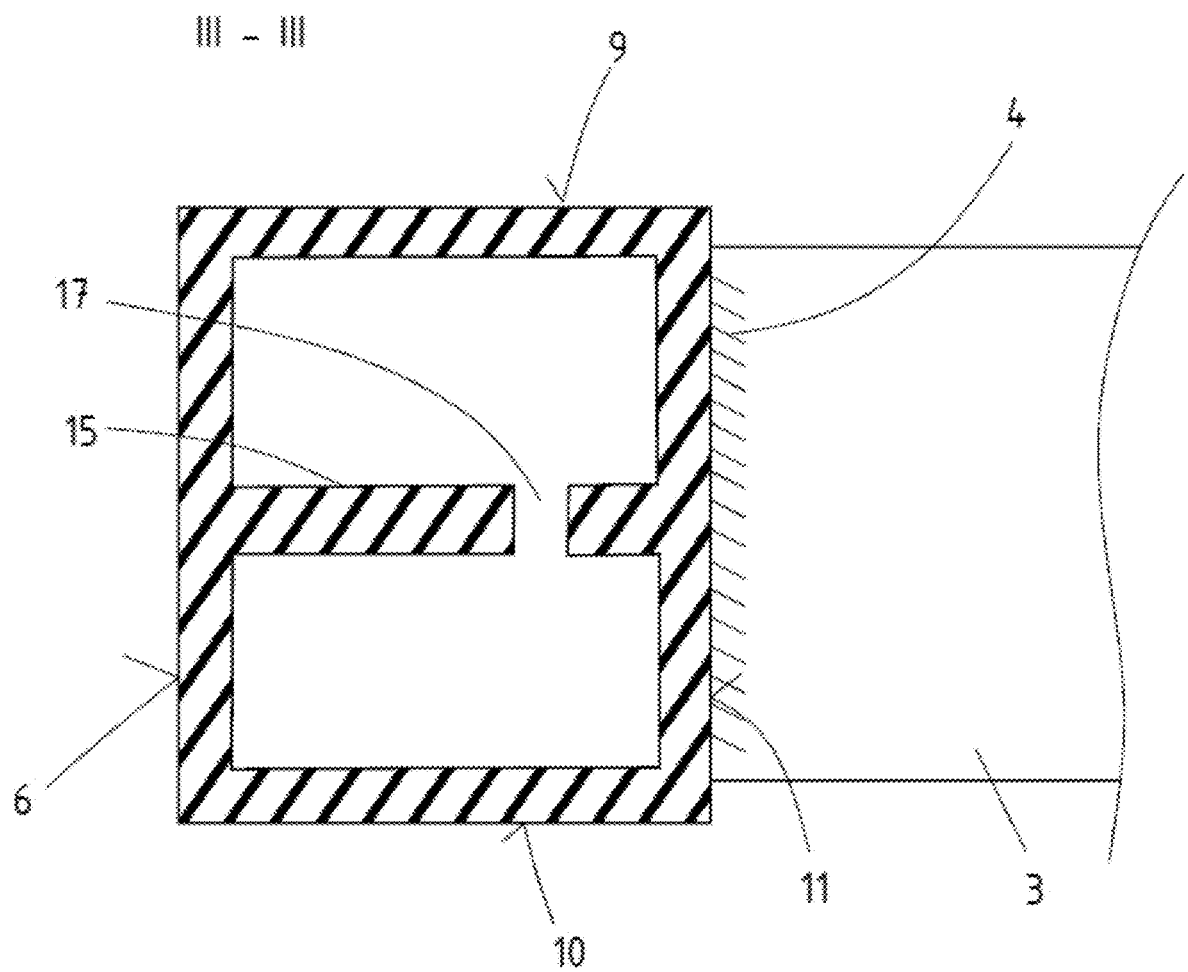

A solution according to the present disclosure is now shown in FIGS. 4A, 4B, and 4C. To this end, the bumper arrangement 1 has a crossmember 2 which is configured here as a two-chamber hollow profile in one preferred design variant. The crossmember 2 has a front wall 6 and a rear wall 11. An attachment, for example via a welded seam, is established in the respective coupling region 4 on the rear wall 11. The welded seam is able to be configured on the upper wall 9, on the lower wall 10 and on the respective side wall of a crash box 3. A slot 17 is configured on all sides, however. The slot 17 is configured here in a central bar 15. The slot 17 extends in length portions in the longitudinal direction 16 of the crossmember 2 or in the motor vehicle transverse direction. The slot 17 is not configured, however, as far as a front side 14 or an outer end of the crossmember 2. The slot 17 extends in length portions over an attaching region 12. This is the attaching region 12 in the longitudinal direction 16 of the crossmember 2, in which attaching region 12 the crossmember 2 is coupled to the crash box 3. The slot 17 is able to extend (at least in length portions) over an end region 13 or into the end region 13. The end region 13 is that region, with which the crossmember 2 projects in the motor vehicle transverse direction laterally or on the outer side beyond the crash box 3. According to the present disclosure, relieving (in the case of a crash in the illustrated scenario of a pole test) of the welded seam, such as an outer vertical welded seam between the crash box 3 and the crossmember 2, is therefore achieved by way of the slot 17, since the crossmember 2 does not forward its deformation directly onto the crash box attachment or crash box 3 situated behind the crossmember 2 in the motor vehicle longitudinal direction. Furthermore, a towing test is also able to be passed, since the crossmember 2 applies a sufficient resistance moment against self-deformation in the case of towing when loaded with a force F and due to the fact that the slot 17 is not of continuous configuration as far as the front-side end 14.

Figure 5:
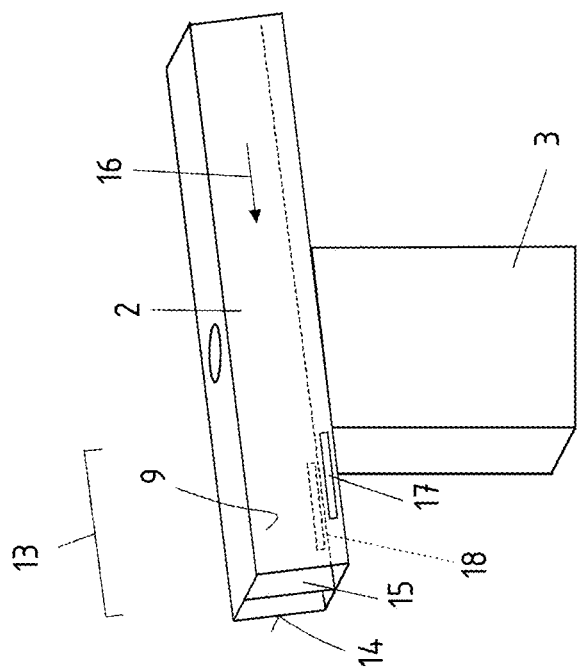
FIG. 5 shows a perspective view of the bumper arrangement according to at least one embodiment.

FIG. 5 shows at least one embodiment of the present disclosure. Two slots 17, 18 are configured here. One slot 17 is arranged in an upper wall 9, and a second slot 18 is arranged in the central bar 15. The two slots 17, 18 are arranged in an end region 13, in relation to the longitudinal direction 16 of the crossmember 2. The two slots 17, 18 are configured with an approximately identical length in the longitudinal direction 16 of the crossmember 2. The two slots 17, 18 are configured at a distance from a front-side end 14, with the result that a continuous part remains in the end region 13 of the crossmember 2, or the front-side end 14 retains its closed cross section.

Figure 6:
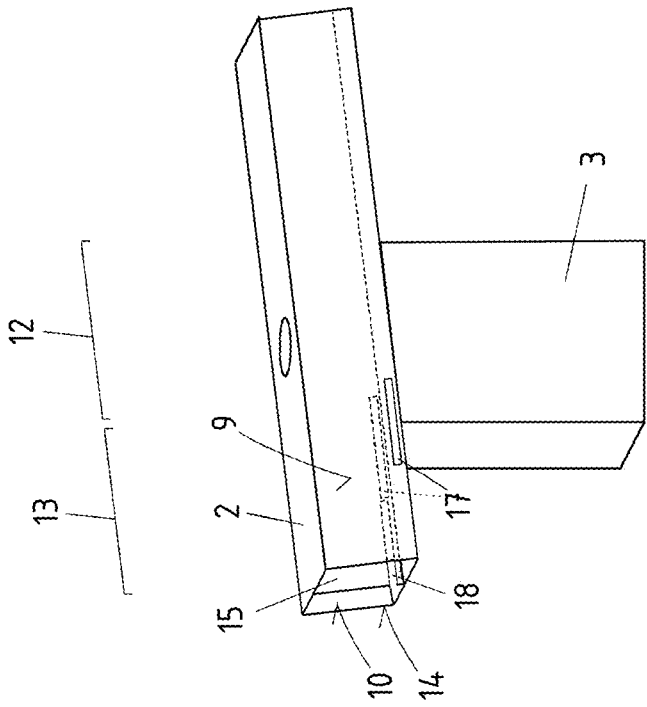
FIG. 6 shows a perspective view of the bumper arrangement according to at least one embodiment.

FIG. 6 shows at least one embodiment where three slots are configured here. A respective first slot 17 is arranged in the upper wall 9 and in the lower wall 10 in each case in the longitudinal direction, at least partially in the attaching region 12 of the crash box 3 and so as to partially cover the end region 13. Furthermore, a second slot 18 is configured. The second slot 18 is arranged in the central bar 15. The second slot 18 is of continuous configuration, however, as far as the front-side end 14.

Figure 7:
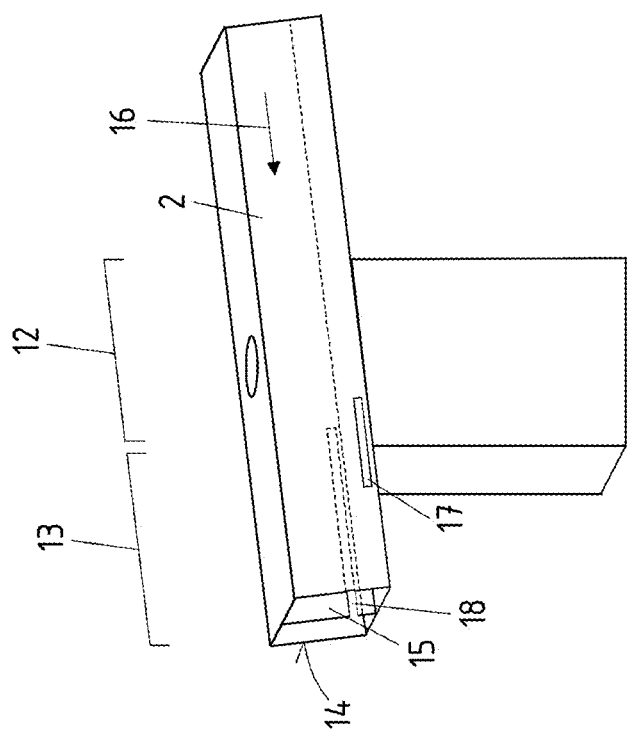
FIG. 7 shows a perspective view of the bumper arrangement according to at least one embodiment.

FIG. 7 shows at least one embodiment where a first slot 17 is configured in the upper wall 9 at least in length portions in the attaching region 12 and in length portions in the end region 13. A second slot 18 is of longer configuration in comparison. The second slot 18 is approximately twice as long in relation to the first slot 17. The second slot 18 is of continuous configuration in the central bar 15 as far as the front-side end 14.

Figure 8:
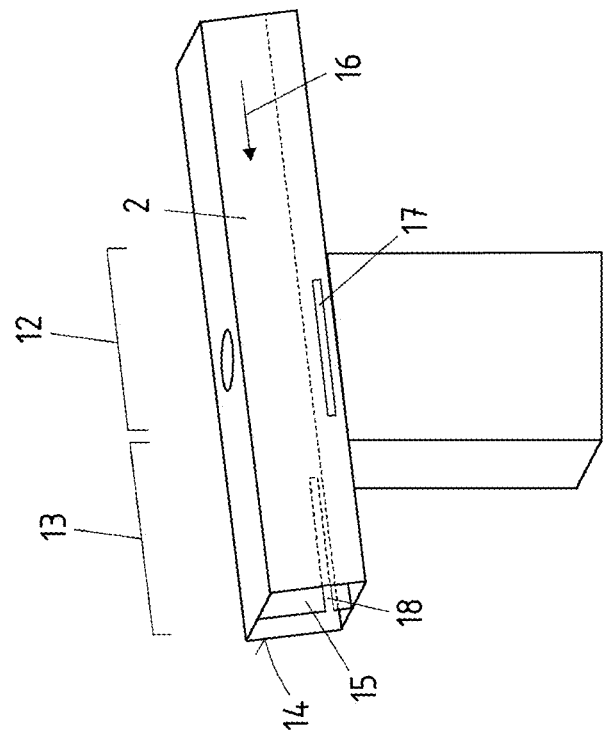
FIG. 8 shows a perspective view of the bumper arrangement according to at least one embodiment.

FIG. 8 shows at least one embodiment having a first slot 17 that is arranged in the upper wall 9 in the attaching region 12 of the crash box 3, and the slot 17 is able to be configured slightly in each case toward the inside in the attaching region 12; for example, having less than 90% of the length of the attaching region 12 in the longitudinal direction 16 of the crossmember 2, or more than 50% of the longitudinal direction. In addition to this, a second slot 18 is able to be arranged in the central bar 15. The second slot 18 which is shown here is of continuous configuration as far as the front-side end 14.

FIG. 9 shows at least one embodiment having a first slot 17 that is arranged in the upper wall 9 and, in relation to the longitudinal direction 16 of the crossmember 2, in the end region 13. A second slot 18 is of longer configuration in comparison. The second slot 18 is configured in the central bar 15. The second slot 18 is of continuous configuration as far as the front-side end 14, and is likewise arranged in the end region 13.

FIG. 10 shows at least one embodiment having two slots that are arranged here, a first slot 17 in the region of the upper wall 9 and the second slot 18 in the central bar 15. The two slots 17, 18 are arranged at least in length portions in the attaching region 12 of the crash box 3, in relation to the longitudinal direction of the crossmember 2.

Figure 11:
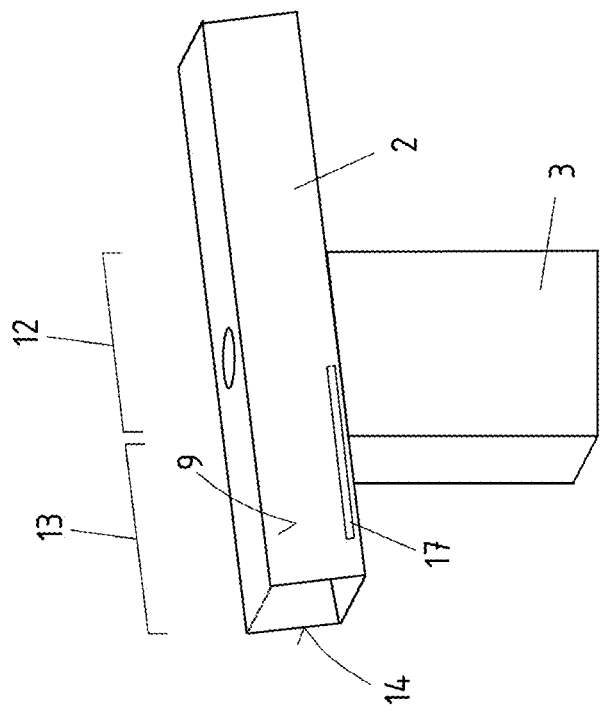
FIG. 11 shows a perspective view of the bumper arrangement according to at least one embodiment.

FIG. 11 shows at least one embodiment where the crossmember 2 is configured as a single-chamber hollow profile. A slot 17 is arranged in the region of the upper wall 9. The slot 17 extends in length portions over the attaching region 12 and is configured at a distance from the front side 14 of the crossmember 2.

Figure 12:
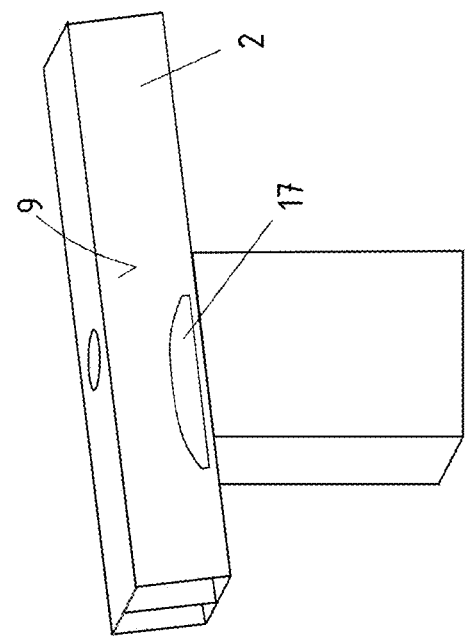
FIG. 12 shows a perspective view of the bumper arrangement according to at least one embodiment.

FIG. 12 shows at least one embodiment having the slot 17 that is configured as a slot 17 which runs in an oval manner in the upper wall 9 of the crossmember 2.

Figure 13:
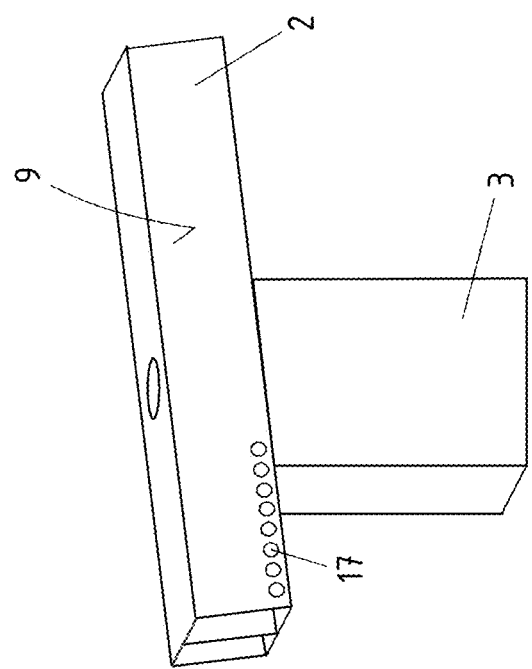
FIG. 13 shows a perspective view of the bumper arrangement according to at least one embodiment.

FIG. 13 shows at least one embodiment where the slot 17 is configured in the form of a hole perforation in the upper wall 9 of the crossmember 2. The slot 17 does not have to be configured in each case to be continuous and to sever the wall completely, as in the preceding embodiments.

Figure 14:
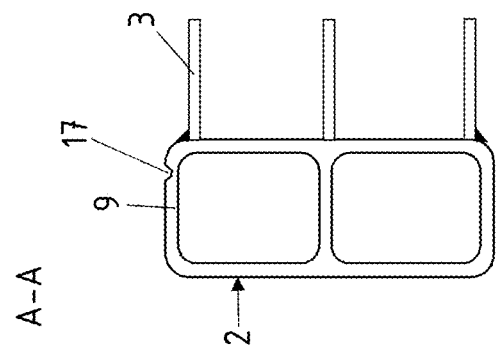
FIG. 14 shows a section A-A of the bumper arrangement according to at least one embodiment.

As shown in FIG. 14, the slot 17 is also able to be configured as a notch, for example, in the upper wall 9 of the crossmember 2 here.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement, comprising:
   a crossmember coupled via crash boxes to a motor vehicle, the crossmember comprising
   end regions, which project laterally beyond the crash boxes in a transverse direction of the motor vehicle, and
   attaching regions, in which the crash boxes are coupled to the crossmember,
   wherein the crossmember is configured in cross section as a closed hollow profile, a first slot, which extends in the transverse direction of the motor vehicle, is configured in an upper wall, a lower wall, or a central bar of the crossmember, the first slot has at least a longitudinal portion in a corresponding attaching region of the attaching regions, an outer end of the upper wall, the lower wall, or the central bar is configured in one piece and from a same material continuously in a longitudinal direction of the motor vehicle, and the first slot extends over at least 20%, but not over more than 80%, of a length of a corresponding end region of the end regions along the transverse direction of the motor vehicle.

2. The bumper arrangement according to claim 1, wherein, in one of the end regions or attaching regions, the crossmember comprises a receptacle for a towing eye, and the receptacle is coupled at least to a front wall of the crossmember.

3. The bumper arrangement according to claim 1, wherein the first slot extends in the transverse direction of the motor vehicle from the corresponding attaching region into the corresponding end region of the end regions.

4. The bumper arrangement according to claim 3, wherein the first slot extends over at least 25% of a length of the corresponding attaching region along the transverse direction of the motor vehicle.

5. The bumper arrangement according to claim 1, wherein the closed hollow profile of the crossmember is a two-chamber hollow profile.

6. The bumper arrangement according to claim 1, wherein a second slot is configured in another one of the upper wall, the lower wall, and the central bar where the first slot is not configured.

7. The bumper arrangement according to claim 6, wherein, along the transverse direction of the motor vehicle, the second slot is longer than the first slot, and the second slot is in the central bar.

8. A bumper arrangement, comprising:
a crossmember coupled via crash boxes to a motor vehicle, the crossmember comprising
end regions, which project laterally beyond the crash boxes in a transverse direction of the motor vehicle, and
attaching regions, in which the crash boxes are coupled to the crossmember,
wherein
the crossmember is configured in cross section as a closed hollow profile,
a first slot, which extends in the transverse direction of the motor vehicle, is configured in an upper wall, a lower wall, or a central bar of the crossmember,
the first slot has at least a longitudinal portion in a corresponding attaching region of the attaching regions,
an outer end of the upper wall, the lower wall, or the central bar is configured in one piece and from a same material continuously in a longitudinal direction of the motor vehicle,
a second slot is configured in another one of the upper wall, the lower wall, and the central bar where the first slot is not configured, and
along the transverse direction of the motor vehicle, the second slot is at least 10% longer than the first slot.

9. The bumper arrangement according to claim 1, wherein, in the longitudinal direction of the motor vehicle, the first slot in the upper wall, lower wall or the central bar is at a rear side adjacent a rear wall of the crossmember.

10. A bumper arrangement, comprising:
a crossmember coupled via crash boxes to a motor vehicle, the crossmember comprising
end regions, which project laterally beyond the crash boxes in a transverse direction of the motor vehicle, and
attaching regions, in which the crash boxes are coupled to the crossmember,
wherein
the crossmember is configured in cross section as a closed hollow profile,
a first slot, which extends in the transverse direction of the motor vehicle, is configured in an upper wall, a lower wall, or a central bar of the crossmember,
the first slot has at least a longitudinal portion in a corresponding attaching region of the attaching regions,
an outer end of the upper wall, the lower wall, or the central bar is configured in one piece and from a same material continuously in a longitudinal direction of the motor vehicle,
a second slot is configured in another one of the upper wall, the lower wall, and the central bar where the first slot is not configured, and
in the longitudinal direction of the motor vehicle, the second slot is closer to a rear wall of the crossmember than the first slot.

11. The bumper arrangement according to claim 3, wherein the first slot extends over more than 30% of a length of the corresponding attaching region along the transverse direction of the motor vehicle.

12. The bumper arrangement according to claim 3, wherein the first slot extends over more than 50% of a length of the corresponding attaching region along the transverse direction of the motor vehicle.

13. The bumper arrangement according to claim 1, wherein the first slot extends over more than 30% of the length of the corresponding end region.

14. The bumper arrangement according to claim 1, wherein the first slot extends over more than 40% of the length of the corresponding end region.

15. The bumper arrangement according to claim 1, wherein the crossmember is configured as an extruded profile.

16. The bumper arrangement according to claim 1, wherein the crossmember is configured as a rollformed profile.

17. The bumper arrangement according to claim 6, wherein, along the transverse direction of the motor vehicle, the second slot is more than 25% longer than the first slot.

18. The bumper arrangement according to claim 6, wherein, along the transverse direction of the motor vehicle, the second slot is more than 50% longer than the first slot, and is at most twice as long as the first slot.

19. The bumper arrangement according to claim 6, wherein, along the transverse direction of the motor vehicle, the second slot is at least 10% longer than the first slot.

20. The bumper arrangement according to claim 6, wherein, in the longitudinal direction of the motor vehicle, the second slot is closer to a rear wall of the crossmember than the first slot.

* * * * *